US008893480B2

(12) United States Patent
Chiba et al.

(10) Patent No.: US 8,893,480 B2
(45) Date of Patent: Nov. 25, 2014

(54) REDUCING AGENT SUPPLY APPARATUS, METHOD FOR CONTROLLING THE SAME, AND EXHAUST GAS PURIFICATION APPARATUS

(75) Inventors: Kunihiro Chiba, Saitama (JP); Atsushi Kikuchi, Saitama (JP); Takeshi Miyamoto, Saitama (JP); Toshiki Sawaki, Saitama (JP); Masanori Watanabe, Saitama (JP); Hiroyuki Watanabe, Saitama (JP)

(73) Assignee: Bosch Corporation, Tokyo (JP)

( * ) Notice: Subject to any disclaimer, the term of this patent is extended or adjusted under 35 U.S.C. 154(b) by 63 days.

(21) Appl. No.: 13/878,054

(22) PCT Filed: Jul. 27, 2011

(86) PCT No.: PCT/JP2011/067024

§ 371 (c)(1),
(2), (4) Date: Apr. 5, 2013

(87) PCT Pub. No.: WO2012/053265

PCT Pub. Date: Apr. 26, 2012

(65) Prior Publication Data

US 2013/0192207 A1 Aug. 1, 2013

(30) Foreign Application Priority Data

Oct. 22, 2010 (JP) ................................. 2010-237636

(51) Int. Cl.
F01N 3/00 (2006.01)
F01N 3/02 (2006.01)
(Continued)

(52) U.S. Cl.
CPC ................ F01N 3/208 (2013.01); Y02T 10/24 (2013.01); F01N 2900/08 (2013.01); F01N
(Continued)

(58) Field of Classification Search
USPC .......................................... 60/295, 286, 301
See application file for complete search history.

(56) References Cited

U.S. PATENT DOCUMENTS 7,644,579 B2 * 1/2010 Roberts et al. ................... 60/286
7,836,684 B2 * 11/2010 Starck et al. .................... 60/286
(Continued)

FOREIGN PATENT DOCUMENTS

JP 2006122878 5/2006
JP 2010180801 8/2010
WO 2009118325 10/2009

OTHER PUBLICATIONS

International Search Report for Application No. PCT/JP2011/067024 dated Nov. 1, 2011 (2 pages).

Primary Examiner — Jesse Bogue
Assistant Examiner — Dapinder Singh
(74) Attorney, Agent, or Firm — Michael Best & Friedrich LLP

(57) ABSTRACT

[Problem] To provide a reducing agent supply apparatus that can quickly melt urea aqueous solution solidified in a reducing agent injection valve to allow early start of the injection control of urea aqueous solution, a method for controlling the reducing agent supply apparatus, and an exhaust gas purification apparatus.
[Means for Resolution] A reducing agent supply apparatus, including: a storage tank for storing liquid reducing agent; a pump for pumping the reducing agent; a reducing agent injection valve for injecting the reducing agent pumped by the pump in an exhaust pipe of an internal combustion engine; and a reducing agent passage connecting the pump to the reducing agent injection valve, wherein, when the internal combustion engine stops, a purge process of collecting the reducing agent in the reducing agent passage into the storage tank is performed, and wherein, on part of the reducing agent passage, a siphon function portion is provided for, even when, at the start of the internal combustion engine, the reducing agent injection valve is in injection failure due to solidification of the reducing agent in the reducing agent injection valve, causing some of the reducing agent to reach the reducing agent injection valve after the start of the pump to cause the solidified reducing agent to melt.

9 Claims, 9 Drawing Sheets

(51) Int. Cl.
*F01N 3/10* (2006.01)
*F01N 3/20* (2006.01)

(52) U.S. Cl.
CPC ............... 2610/02 (2013.01); *F01N 2610/1493* (2013.01); *F01N 3/2066* (2013.01); *F01N 2610/14* (2013.01)
USPC .................... 60/295; 60/286; 60/299; 60/301

(56) References Cited

U.S. PATENT DOCUMENTS

| | | | |
|---|---|---|---|
| 7,895,829 B2* | 3/2011 | Suzuki et al. | 60/286 |
| 2003/0213234 A1* | 11/2003 | Funk et al. | 60/286 |
| 2008/0092531 A1* | 4/2008 | Suzuki et al. | 60/301 |
| 2009/0100824 A1* | 4/2009 | Starck et al. | 60/286 |
| 2010/0154907 A1* | 6/2010 | Lecea et al. | 137/565.29 |
| 2011/0016853 A1 | 1/2011 | Tipton | |

* cited by examiner

REDUCING AGENT SUPPLY APPARATUS, METHOD FOR CONTROLLING THE SAME, AND EXHAUST GAS PURIFICATION APPARATUS

BACKGROUND OF THE INVENTION

The present invention relates to a reducing agent supply apparatus for injecting in an exhaust pipe liquid reducing agent used for purifying exhaust gas from an internal combustion engine, a method for controlling the reducing agent supply apparatus, and an exhaust gas purification apparatus.

Conventionally, as one aspect of an exhaust gas purification apparatus for removing nitrogen oxides ($NO_x$) in exhaust gas from an internal combustion engine, a urea selective catalytic reduction (SCR) system is practically used which includes: a reducing agent supply apparatus for injecting urea aqueous solution in an exhaust pipe; and a reducing catalyst that adsorbs ammonia produced by decomposition of urea in urea aqueous solution then selectively reacts $NO_x$ in incoming exhaust gas with the ammonia to reduce the $NO_x$.

The reducing agent supply apparatus used in such a urea SCR system includes: a storage tank for storing urea aqueous solution; a pump for sucking up and pumping urea aqueous solution stored in the storage tank; and a reducing agent injection valve for injecting the pumped urea aqueous solution in the exhaust pipe.

Here, urea aqueous solution as a liquid reducing agent is adjusted to a concentration having the lowest solidifying point (e.g., 32.5% concentration with the solidifying point of about −11° C.) so as not to freeze even in cold climates. However, when the concentration increases due to evaporation of solvent in urea aqueous solution or the like reason, the solidifying point increases to make urea aqueous solution more likely to solidify. When urea aqueous solution solidifies in the reducing agent injection valve or a reducing agent passage while the internal combustion engine is stopping, the next injection of urea aqueous solution may not be properly performed. So, while the internal combustion engine is stopping, a purge process of collecting urea aqueous solution in the reducing agent supply apparatus into the storage tank is performed (e.g., see JP-A-2010-7560).

SUMMARY OF THE INVENTION

However, even if the purge process is performed, it is practically difficult to completely collect urea aqueous solution remaining in a small gap, such as the periphery of a valve body of the reducing agent injection valve. Furthermore, the reducing agent supply apparatus includes a means for cooling the reducing agent injection valve, so the reducing agent injection valve is cooled while the internal combustion engine is operating, but, in many cases, when the internal combustion engine stops, the cooling means also stops functioning, which makes urea aqueous solution remaining in the reducing agent injection valve more likely to be heated due to influence of heat of the exhaust pipe and the like.

When the remaining urea aqueous solution is heated, the solvent evaporates to increase the concentration, thereby increasing the solidifying point of the urea aqueous solution. Accordingly, in the course of cooling the urea aqueous solution as time elapses, the urea aqueous solution remaining in the reducing agent injection valve becomes more likely to solidify, thereby making the reducing agent injection valve more likely to be stuck closed.

If the reducing agent injection valve is stuck closed, even when urea aqueous solution is pumped in the next start of the internal combustion engine, gas (air or exhaust gas) accumulating in the reducing agent passage is less likely to move through the passage, preventing the urea aqueous solution from reaching the reducing agent injection valve. In this state, unless the reducing agent injection valve is heated by exhaust heat or the like and ambient temperature exceeds the solidifying point of the solidified urea aqueous solution, the solidified urea aqueous solution will not melt. Then, the reducing agent injection valve cannot start the injection control of urea aqueous solution, during which the purification of $NO_x$ may be insufficient.

The present inventors found a solution to the above-described problems and completed the invention by providing on part of the reducing agent passage a siphon function portion that satisfies a predetermined condition to, even when the reducing agent injection valve is in injection failure due to solidified urea aqueous solution in the reducing agent injection valve, cause some of the urea aqueous solution to reach the reducing agent injection valve immediately after the start of the pump. That is, it is an object of the invention to provide a reducing agent supply apparatus that can quickly melt urea aqueous solution solidified in the reducing agent injection valve to allow early start of the injection control of urea aqueous solution, a method for controlling the reducing agent supply apparatus, and an exhaust gas purification apparatus.

According to the invention, a reducing agent supply apparatus is provided, including: a storage tank for storing liquid reducing agent; a pump for pumping the reducing agent; a reducing agent injection valve for injecting the reducing agent pumped by the pump in an exhaust pipe of an internal combustion engine; and a reducing agent passage connecting the pump to the reducing agent injection valve, wherein, when the internal combustion engine stops, a purge process of collecting the reducing agent in the reducing agent passage into the storage tank is performed, and wherein, on part of the reducing agent passage, a siphon function portion is provided for, even when, at the start of the internal combustion engine, the reducing agent injection valve is in injection failure due to solidification of the reducing agent in the reducing agent injection valve, causing some of the reducing agent to reach the reducing agent injection valve after the start of the pump to cause the solidified reducing agent to melt. This reducing agent supply apparatus can solve the above-described problem.

Specifically, according to the reducing agent supply apparatus of the invention, reducing agent can be accumulated in the siphon function portion provided on part of the reducing agent passage, and, even with the reducing agent injection valve stuck closed, when gas in the reducing agent passage is compressed in connection with driving of the pump, the accumulated reducing agent can be caused to quickly reach the inside of the reducing agent injection valve. As a result, reducing agent solidified in the reducing agent injection valve can be caused to quickly melt, allowing early start of the injection control using the reducing agent injection valve.

Furthermore, in configuring the reducing agent supply apparatus of the invention, the siphon function portion is preferably configured to include: a first area provided adjacent to the reducing agent injection valve, in which a reducing agent passage is placed downwardly from the position in height of the reducing agent injection valve; and a second area provided adjacent to the first area, in which a reducing agent passage is placed upwardly from the position in height of the deepest portion of the first area, and so that, at the start of the internal combustion engine, when the reducing agent injection valve is closed and the pump is started, the front face of pumped reducing agent will reach the inside of the second area.

In the reducing agent supply apparatus of the invention, by configuring the siphon function portion in consideration of the position of the front face of the reducing agent at the start of pumping the reducing agent, even when the reducing agent injection valve is closed, some of the reducing agent can be caused to reach the inside of the siphon function portion immediately after the start of the pump. In addition, since the reducing agent passage forming the second area is in a predetermined configuration, even when the inside of the reducing agent passage is subsequently depressurized, some of the reducing agent can be accumulated by gravity in the deepest portion of the siphon function portion.

Furthermore, in configuring the reducing agent supply apparatus of the invention, the siphon function portion is preferably configured so that the following equation (I) holds:

[Eq. 1]

$$Vdv + Va + Vb > \left( \sqrt[n]{\frac{Pa}{Ps}} \right) \cdot Vtotal \quad (I)$$

Vdv: capacity of reducing agent circulation space in the reducing agent injection valve Va: capacity of reducing agent circulation space in the first area Vb: capacity of reducing agent circulation space in the second area Vtotal: capacity of reducing agent circulation space from the outlet of the pump to injection nozzles of the reducing agent injection valve Pa: atmospheric pressure Ps: set pressure when pumping reducing agent (system pressure)

n: polytropic exponent

In the reducing agent supply apparatus of the invention, by configuring the siphon function portion so that the sum of the capacities of reducing agent circulation space in the siphon function portion and in the reducing agent injection valve is larger than the capacity of gas for the capacity of reducing agent circulation space from the outlet of the pump to the injection nozzles of the reducing agent injection valve when pressurized to a pressure set for pumping the reducing agent, the siphon function portion can be easily configured that can cause some of the reducing agent to reach the inside of the siphon function portion immediately after the start of the pump.

Furthermore, in configuring the reducing agent supply apparatus of the invention, the first area is preferably configured so that, at the start of the internal combustion engine, when the reducing agent injection valve is closed and the pump is started, reducing agent accumulated in the deepest portion of the first area will reach the inside of the reducing agent injection valve.

In the reducing agent supply apparatus of the invention, by configuring the first area in consideration of the position of the front face of the reducing agent accumulated in the siphon function portion at the start of the pump, even when the reducing agent injection valve is stuck closed, some of the reducing agent can be caused to securely reach the inside of the reducing agent injection valve by driving of the pump.

Furthermore, in configuring the reducing agent supply apparatus of the invention, the siphon function portion is preferably configured so that the following equation (II) holds:

[Eq. 2]

$$Vdv > \left( \sqrt[n]{\frac{Pa}{Ps}} \right) \cdot (Vdv + Va) \quad (II)$$

Vdv: capacity of reducing agent circulation space in the reducing agent injection valve Va: capacity of reducing agent circulation space in the first area Pa: atmospheric pressure Ps: set pressure when pumping reducing agent (system pressure)

n: polytropic exponent

In the reducing agent supply apparatus of the invention, by configuring the first area so that the capacity of reducing agent circulation space in the reducing agent injection valve is larger than the capacity of gas for the sum of the capacities of reducing agent circulation space in the first area and in the reducing agent injection valve when pressurized to a pressure set for pumping the reducing agent, the siphon function portion can be easily configured that can cause some of the reducing agent accumulated in the deepest portion to quickly reach the inside of the reducing agent injection valve by driving of the pump.

Furthermore, in configuring the reducing agent supply apparatus of the invention, it is preferable that the second area includes a plurality of areas having different angles with the horizontal plane, and the angle between the area near the first area and the horizontal plane is relatively smaller.

In the reducing agent supply apparatus of the invention, by making small the angle between the area near the first area among the plurality of areas and the horizontal plane, in the proximity to the deepest portion of the siphon function portion, when the inside of the reducing agent passage is depressurized, the reducing agent becomes laminar to facilitate securing of a passage for gas, which can make the reducing agent more likely to be accumulated, while, when the inside of the reducing agent passage is pressurized, the reducing agent blocks the reducing agent passage, which can make the reducing agent more likely to move toward the reducing agent injection valve.

Furthermore, another aspect of the invention is a method for controlling a reducing agent supply apparatus, the reducing agent supply apparatus including: a storage tank for storing liquid reducing agent; a pump for pumping the reducing agent; a reducing agent injection valve for injecting the reducing agent pumped by the pump in an exhaust pipe of an internal combustion engine; and a reducing agent passage connecting the pump to the reducing agent injection valve, wherein, on part of the reducing agent passage, a siphon function portion is provided for, even when, at the start of the internal combustion engine, the reducing agent injection valve is in injection failure due to solidification of the reducing agent in the reducing agent injection valve, causing some of the reducing agent to reach the reducing agent injection valve after the start of the pump to cause the solidified reducing agent to melt, wherein, when the internal combustion engine stops, a purge process of collecting the reducing agent in the reducing agent passage into the storage tank is performed, wherein the method including the steps of: at the start of the internal combustion engine, determining whether or not, after the start of pumping the reducing agent, injection of the reducing agent has been performed according to an injection instruction to the reducing agent injection valve; and if the injection of the reducing agent has not been performed, temporarily decreasing pressure in the reducing agent passage and then increasing the pressure again, and wherein the steps are repeated until the injection of the reducing agent is performed.

According to the method for controlling a reducing agent supply apparatus of the invention, in the reducing agent supply apparatus in which a predefined siphon function portion is provided on part of the reducing agent passage, pressurizing and depressurizing of the reducing agent passage is repeated until successful injection of the reducing agent is performed so that, even when the reducing agent injection valve is stuck closed due to solidified reducing agent, the solidified reducing agent can be caused to melt as quickly as possible, allowing early start of the injection control of reducing agent.

Yet another aspect of the invention is an exhaust gas purification apparatus of an internal combustion engine, including any reducing agent supply apparatus described above and a reducing catalyst for selectively reacting nitrogen oxides in exhaust gas with reducing agent to reduce the nitrogen oxides.

According to the exhaust gas purification apparatus of an internal combustion engine of the invention, a reducing agent supply apparatus in which a predefined siphon function portion is provided on part of a reducing agent passage is included so that, even when the reducing agent injection valve is stuck closed, reducing agent solidified in the reducing agent injection valve can be caused to quickly melt, allowing early start of the injection control using the reducing agent injection valve. Accordingly, purification efficiency of $NO_x$ can be increased from the start of the internal combustion engine.

As used herein, the term "the front face of reducing agent (or urea aqueous solution)" means an interface on the reducing agent injection valve side of reducing agent (or urea aqueous solution) that is pumped by the pump to circulate in the reducing agent passage.

DETAILED DESCRIPTION

Embodiments of a reducing agent supply apparatus, a method for controlling the reducing agent supply apparatus, and an exhaust gas purification apparatus of an internal combustion engine of the invention are specifically described below with reference to the drawings as appropriate. However, the embodiments described below are intended to show only an aspect of the invention and not intended to limit the invention, so may be appropriately modified within the scope of the invention. Note that, through the drawings, like numerals denote like components, and duplicative descriptions will be appropriately omitted.

1. Exhaust Gas Purification Apparatus (1) Overall Configuration

Figure 1:
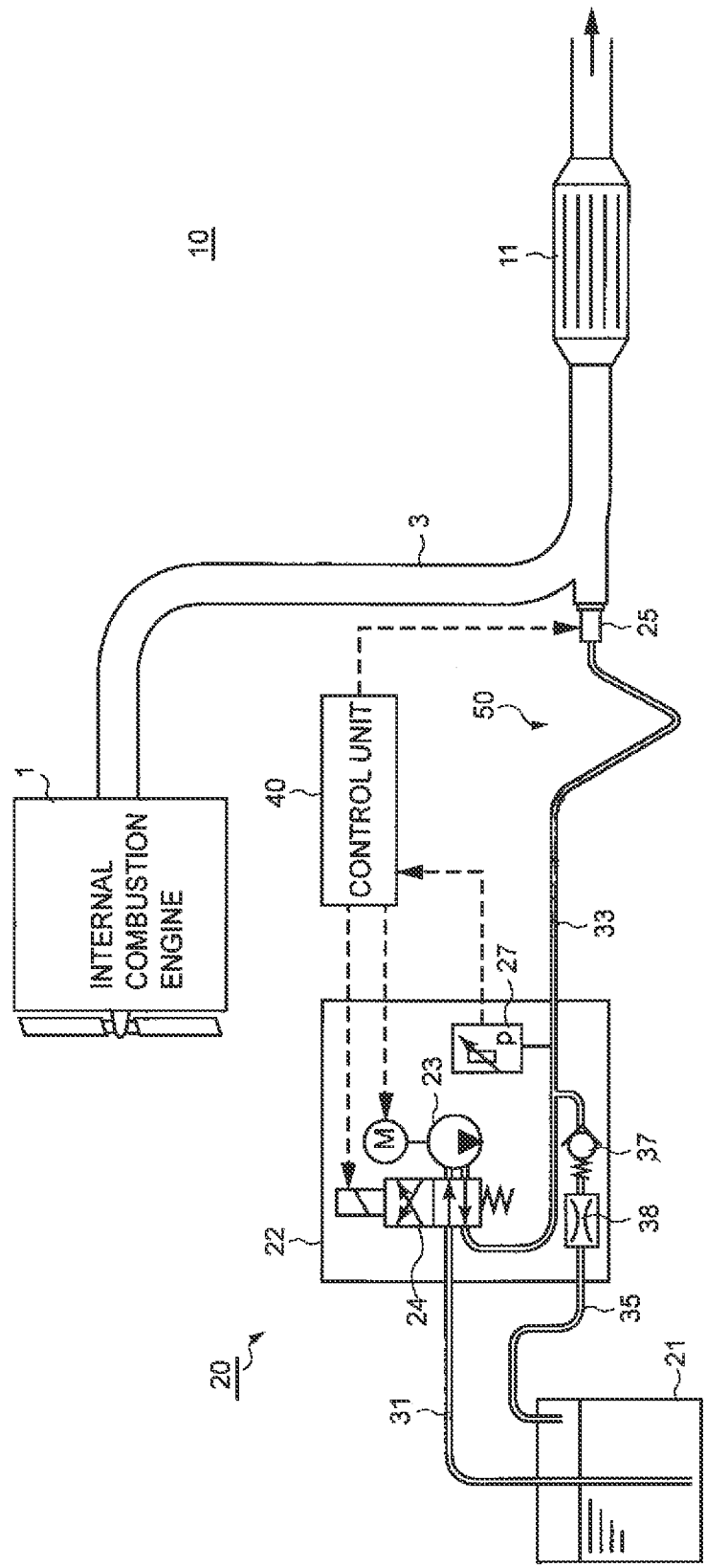
[FIG. 1] A diagram showing an example of overall configuration of an exhaust gas purification apparatus in accordance with an embodiment of the invention.

FIG. 1 shows a configuration example of an exhaust gas purification apparatus 10 in accordance with an embodiment of the invention. This exhaust gas purification apparatus 10 is an exhaust gas purification apparatus that purifies $NO_x$ in exhaust gas from an internal combustion engine 1 mounted on a vehicle or the like, in a reducing catalyst 11 using ammonia.

The exhaust gas purification apparatus 10 includes as main components: the reducing catalyst 11 provided in the middle of an exhaust pipe 3 connected to an exhausted system of the internal combustion engine 1; a reducing agent supply apparatus 20 that supplies by injection urea aqueous solution as a liquid reducing agent in the exhaust pipe 3 upstream of the reducing catalyst 11; and a control processing unit 40 for controlling the operation of the reducing agent supply apparatus 20.

(2) Reducing Catalyst

The reducing catalyst 11 is a reducing catalyst capable of adsorbing ammonia produced by decomposition of urea in urea aqueous solution injected in the exhaust pipe 3 then selectively reacting $NO_x$ in exhaust gas flowing into the catalyst with the ammonia to reduce and purify the $NO_x$.

(3) Reducing Agent Supply Apparatus (3-1) Basic Configuration

The reducing agent supply apparatus 20 includes as main components: a storage tank 21 for storing urea aqueous solution; a pump unit 22 including a pump 23 for pumping urea aqueous solution; and a reducing agent injection valve 25 for injecting in the exhaust pipe 3 the urea aqueous solution pumped from the pump 23. Among these, the pump 23 and the reducing agent injection valve 25 are drive-controlled by the control processing unit 40.

The storage tank 21 is connected to the pump 23 by a first reducing agent passage 31. The pump 23 is connected to the reducing agent injection valve 25 by a second reducing agent passage 33. The second reducing agent passage 33 is provided with a pressure sensor 27 for detecting a pressure Pu in the second reducing agent passage 33.

Furthermore, the second reducing agent passage 33 is connected with a return passage 35 with the other end connected to the storage tank 21. The return passage 35 is provided with a relief valve 37 and an orifice 38 in this order from the second reducing agent passage 33 side. The relief valve 37 has a valve opening pressure that is set to a value lower than a set pressure of urea aqueous solution supplied to the reducing agent injection valve 25 (hereinafter simply referred to as "system pressure"). The orifice 38 prevents the pressure in the second reducing agent passage 33 from excessively pulsing in response to opening/closing of the relief valve 37.

For the reducing agent injection valve 25, for example, an electromagnetic valve is used in which the open/close of the valve is switched by energizing/non-energizing the valve. In this embodiment, the reducing agent injection valve 25 included in the reducing agent supply apparatus 20 directly injects urea aqueous solution in the exhausted pipe 3. Injection nozzles are attached on the periphery of the exhaust pipe 3 so as to face the inside of the exhaust pipe 3.

For the pump 23, for example, an electric pump is used, the output power of which can be adjusted by the energization amount. In this embodiment, the output power of the pump 23 is feedback-controlled based on the difference ΔP between a pressure Pu in the second reducing agent passage 33 detected by the pressure sensor 27 and a system pressure Ps so that the pressure Pu is maintained equal to the system pressure Ps.

Furthermore, the pump unit 22 is provided with a reverting valve 24 for changing the flowing direction of urea aqueous solution pumped by the pump 23 to forward or reverse direction. The reverting valve 24 is, for example, an electromagnetic valve drive-controlled by the control processing unit 40. In this embodiment, the reverting valve 24 can switch between a first state and a second state. In the first state, the inlet side of the pump 23 is connected to the first reducing agent passage 31, and the outlet side of the pump 23 is connected to the second reducing agent passage 33. In the second state, the outlet side of the pump 23 is connected to the first reducing agent passage 31, and the inlet side of the pump 23 is connected to the second reducing agent passage 33.

Then, in controlling the injection of urea aqueous solution in the exhaust pipe 3, the reverting valve 24 switches the flowing direction of urea aqueous solution to the forward direction from the storage tank 21 side toward the reducing agent injection valve 25 side. On the other hand, in performing a purge process of collecting urea aqueous solution into the storage tank 21, the reverting valve 24 switches the flowing direction of urea aqueous solution to the reverse direction from the reducing agent injection valve 25 side to toward the storage tank 21 side. Alternatively, the purge process may be performed by reversing the direction of rotation of the pump 23 without the reverting valve 24.

(3-2) Basic Operation

Next, the basic operation of the reducing agent supply apparatus 20 of this embodiment is described.

First, when the internal combustion engine 1 is operating, the flowing direction of urea aqueous solution is switched to the forward direction and the pump 23 is driven. Then, urea aqueous solution in the storage tank 21 is sucked up by the pump 23 and pumped toward the reducing agent injection valve 25 through the second reducing agent passage 33. At this time, if the pressure Pu in the second reducing agent passage 33 exceeds the valve opening pressure of the relief valve 37, the relief valve 37 opens and some of the urea aqueous solution is collected into the storage tank 21 through the return passage 35.

While circulating urea aqueous solution in this way, the control processing unit 40 feedback-controls the output power of the pump 23 so that the pressure Pu in the second reducing agent passage 33 detected by the pressure sensor 27 is equal to the predetermined system pressure Ps. With this state, the control processing unit 40 performs energization control of the reducing agent injection valve 25 according to an indicated injection amount determined by calculation to cause urea aqueous solution to be injected in the exhaust pipe 3.

On the other hand, when the internal combustion engine 1 is stopping, the flowing direction of urea aqueous solution is switched to the reverse direction and the pump 23 is driven with the reducing agent injection valve 25 open. Then, gas in the exhaust pipe 3 (air and exhaust gas) is sucked into the second reducing agent passage 33 through the injection nozzles of the reducing agent injection valve 25, then urea aqueous solution is collected into the storage tank 21 while being replaced with gas in the reducing agent injection valve 25 and the second reducing agent passage 33. During this purge process, the relief valve 37, having a check valve structure, is closed.

(3-3) Siphon Function Portion

Here, part of the second reducing agent passage 33 of the reducing agent supply apparatus 20 is provided with a siphon function portion 50. The siphon function portion 50 is capable of, even when, at the start of the internal combustion engine 1, the reducing agent injection valve 25 is in injection failure due to solidified urea aqueous solution in the reducing agent injection valve 25, causing some of the urea aqueous solution to reach the reducing agent injection valve 25 immediately after the start of the pump 23 to make the solidified urea aqueous solution more likely to melt.

Figure 2:
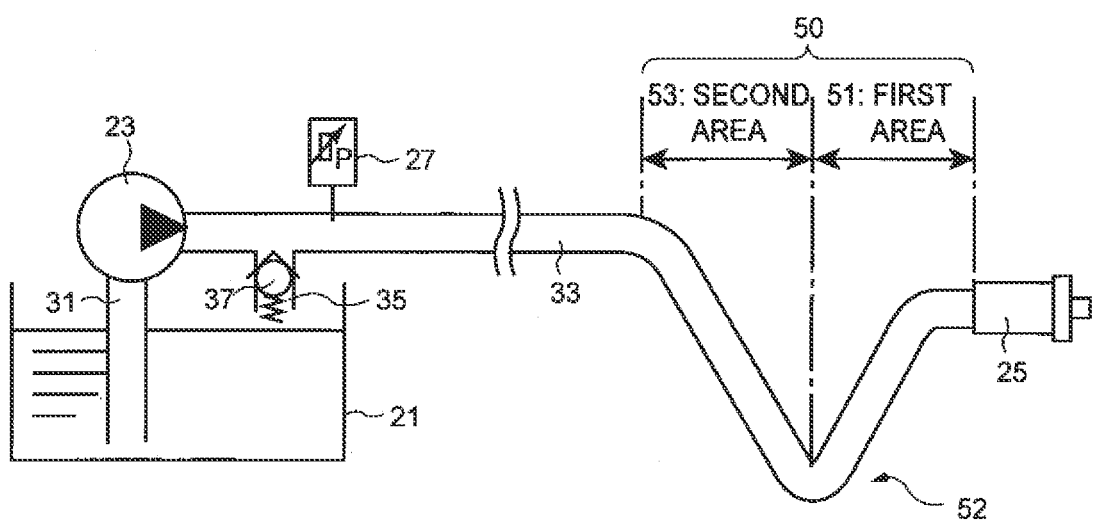
[FIG. 2] A diagram for describing a configuration of a reducing agent supply apparatus in accordance with the embodiment of the invention.

FIG. 2 is for describing a configuration of the siphon function portion 50 provided in the reducing agent supply apparatus 20 of the embodiment.

The siphon function portion 50 is configured using the pipe forming the second reducing agent passage 33 connecting the pump 23 to the reducing agent injection valve 25, and includes a first area 51 and a second area 53.

The first area 51 is a part of the second reducing agent passage 33 provided adjacent to the reducing agent injection valve 25 and is an area in which the pipe is placed downwardly from the position in height of the reducing agent injection valve 25. On the other hand, the second area 53 is a part of the second reducing agent passage 33 provided farther from the reducing agent injection valve 25 and contiguously from the first area 51 and is an area in which the pipe is placed upwardly from the position in height of the deepest portion 52 of the first area 51.

Specifically, the first area 51 is defined as an area from the connection with the reducing agent injection valve 25 to the deepest portion 52 of the pipe forming the siphon function portion 50, and the second area 53 is defined as an area from the deepest portion 52 to the portion at which the pipe is placed almost horizontally. Providing adjacent to the reducing agent injection valve 25 the first area 51 placed downwardly from the position in height of the reducing agent injection valve 25 is intended to, during the purge process, make urea aqueous solution in the reducing agent injection valve 25 more likely to move to the second reducing agent passage 33 side.

The first area 51 and the second area 53 of the siphon function portion 50 have capacities defined so that, while urea aqueous solution is being collected from the reducing agent injection valve 25 and the second reducing agent passage 33, when the pump 23 is driven with the reducing agent injection valve 25 closed, the front face of urea aqueous solution pumped by the pump 23 will reach the second area 53, and urea aqueous solution accumulated in the deepest portion 52 of the siphon function portion 50 will reach the inside of the reducing agent injection valve 25.

Here, FIGS. 3(a) to 3(e) are for specifically describing the setting of the length and capacity of the first area 51 and the second area 53 for causing the front face of urea aqueous solution pumped by the pump 23 to reach the second area 53. FIGS. 4(a) to 4(b) are for specifically describing the setting of the capacity of the first area 51 for causing urea aqueous solution accumulated in the deepest portion 52 of the siphon function portion 50 to reach the inside of the reducing agent injection valve 25.

Figure 3:
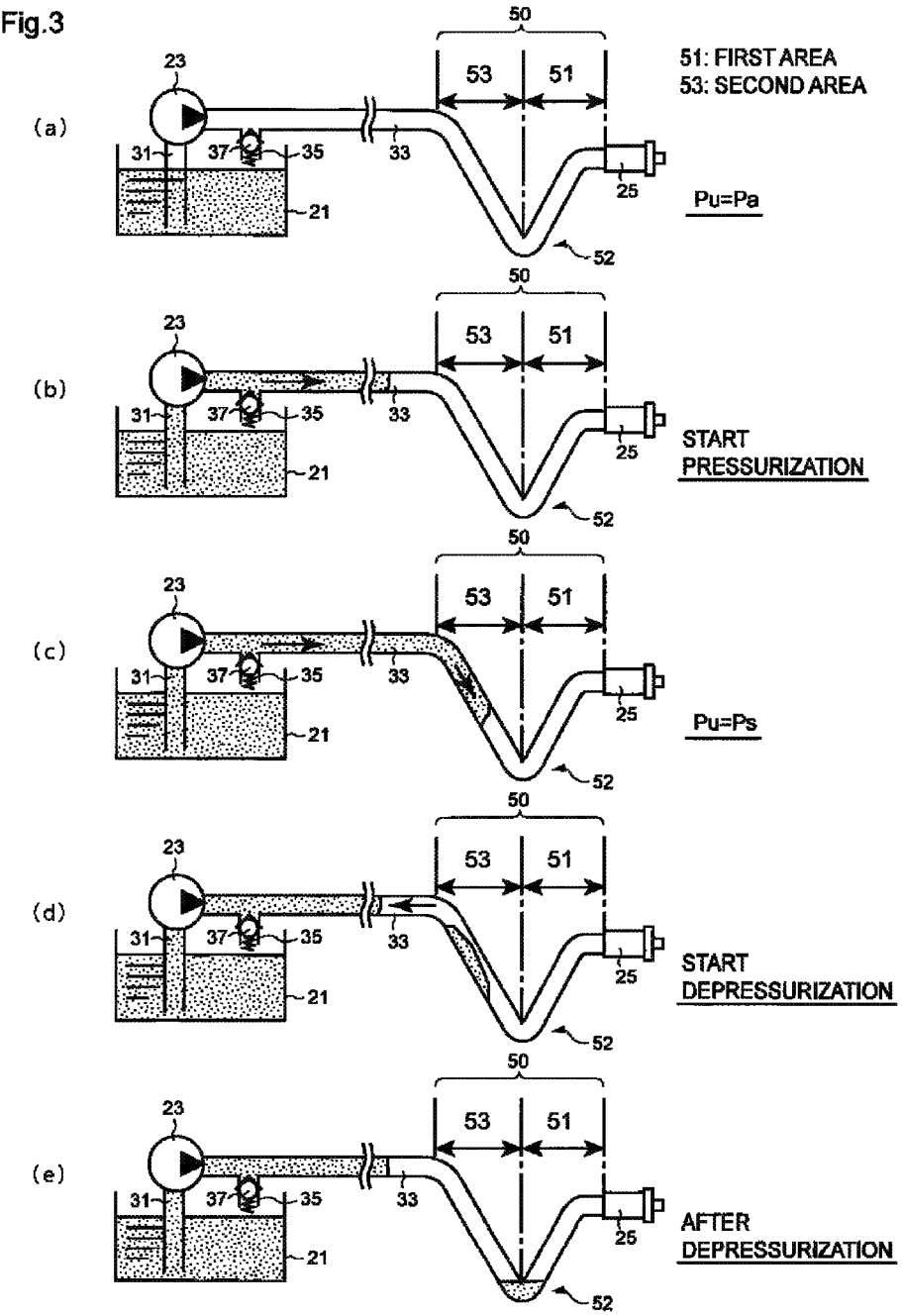
[FIG. 3] A diagram for describing the configuration and effect of a siphon function portion.
Figure 4:
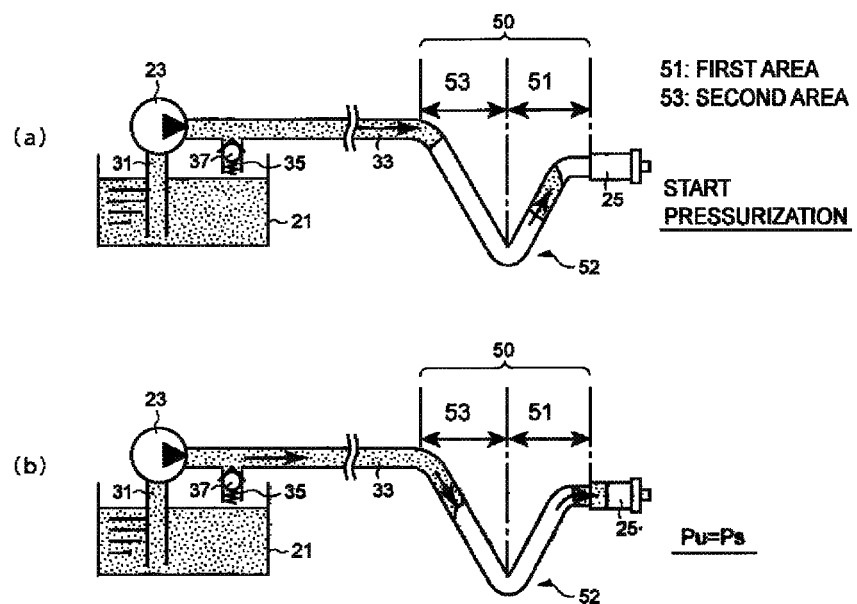
[FIG. 4] Another diagram for describing the configuration and effect of the siphon function portion.

When urea aqueous solution has been collected into the storage tank 21 and the pump 23 has stopped, the reducing agent injection valve 25 and the second reducing agent passage 33 are filled with gas and the inside pressure Pu is equal to an atmospheric pressure Pa, as shown in FIG. 3(a). On the other hand, after the start of the pump 23, the pressure Pu in the reducing agent injection valve 25 and the second reducing agent passage 33 increases, and gas in the reducing agent injection valve 25 and the second reducing agent passage 33 is compressed by pumped urea aqueous solution and the volume of the gas decreases, as shown in FIG. 3(b). At this time, if the reducing agent injection valve 25 is stuck closed, there is no way through which gas can move.

At this time, the capacities of the first area 51 and the second area 53 of the siphon function portion 50 are set so that, when the pressure Pu in the second reducing agent passage 33 increases to the system pressure Ps, even with the reducing agent injection valve 25 closed, the front face of pumped urea aqueous solution will reach the inside of the second area 53, in other words, the gas will be compressed to the inside of the second area 53, as shown in FIG. 3(c).

With the first area 51 and the second area 53 configured as above, then, when the output power of the pump 23 is reduced to decrease the pressure in the second reducing agent passage 33, some urea aqueous solution cannot climb up the slope of the second area 53 and is left in the second area 53, as shown in FIG. 3(d). As a result, the some urea aqueous solution can be accumulated in the deepest portion 52 of the siphon function portion 50, as shown in FIG. 3(e).

Furthermore, with the some urea aqueous solution accumulated in the deepest portion 52 of the siphon function portion 50, when the pump 23 is driven to pressurize the inside of the second reducing agent passage 33, gas sandwiching the accumulated urea aqueous solution is compressed and the volume of the gas decreases, as shown in FIG. 4(a). At this time, the capacity of the first area 51 of the siphon function portion 50 is set so that, when the pressure Pu in the second reducing agent passage 33 increases to the system pressure Ps, even with the reducing agent injection valve 25 closed, the accumulated urea aqueous solution will reach the inside of the reducing agent injection valve 25, in other words, the gas on the reducing agent injection valve 25 side with respect to the deepest portion 52 will be compressed to the inside of the reducing agent injection valve 25, as shown in FIG. 4(b).

Next, a method for designing the thus configured siphon function portion 50 is described based on the volume change of gas in response to internal pressure.

The capacity of the circulation space of urea aqueous solution in the reducing agent injection valve 25 is denoted by Vdv. The capacity of the circulation space of urea aqueous solution in the first area 51 is denoted by Va. The capacity of the circulation space of urea aqueous solution in the second area 53 is denoted by Vb. The total capacity of the circulation space of urea aqueous solution from the outlet of the pump 23 to the injection nozzles of the reducing agent injection valve 25 is denoted by Vtotal.

First, by approximating the state change of gas in the siphon function portion 50 by polytropic change, the following equation (III) holds:

[Eq. 3]

$$P \cdot V^n = \text{const} \tag{III}$$

P: pressure
V: volume
n: polytropic exponent

Assume that the reducing agent injection valve 25 is completely closed. The volume of the gas for the above-mentioned total capacity Vtotal when the inside of the reducing agent injection valve 25 and the second reducing agent passage 33 is pressurized to the system pressure Ps is denoted by Vs. Then, from the above equation (III), the following equations (IV) and (V) hold:

[Eq. 4]

$$Pa \cdot Vtotal^n = Ps \cdot Vs^n \tag{IV}$$

Pa: atmospheric pressure
Ps: set pressure when pumping urea aqueous solution (system pressure)
Vtotal: capacity of reducing agent circulation space from the outlet of the pump to the injection nozzles of the reducing agent injection valve
Vs: volume of air for Vtotal under the system pressure
n: polytropic exponent

[Eq. 5]

$$\frac{Vs}{Vtotal} = \sqrt[n]{\frac{Pa}{Ps}} \tag{V}$$

Vs: volume of air for Vtotal under the system pressure
Vtotal: capacity of reducing agent circulation space from the outlet of the pump to the injection nozzles of the reducing agent injection valve
Pa: atmospheric pressure
Ps: set pressure when pumping reducing agent (system pressure)
n: polytropic exponent With the reducing agent injection valve 25 completely closed, in order to cause the front face of urea aqueous solution pumped by the pump 23 to reach the second area 53, the volume Vs of the gas under the system pressure Ps should be smaller than the sum of the capacity Vdv of the reducing agent injection valve 25, the capacity Va of the first area 51 and the capacity Vb of the second area 53, as shown in the following equation (VI):

[Eq. 6]

$$Vdv + Va + Vb > Vs \tag{VI}$$

Vdv: capacity of reducing agent circulation space in the reducing agent injection valve
Va: capacity of reducing agent circulation space in the first area
Vb: capacity of reducing agent circulation space in the second area
Vs: volume of air for Vtotal under the system pressure From the above equations (V) and (VI), it can be seen that the siphon function portion 50 should be configured so that the sum of the capacity Vdv of the reducing agent injection valve 25, the capacity Va of the first area 51 and the capacity Vb of the second area 53 satisfies the following equation (I):

[Eq. 7]

$$Vdv + Va + Vb > \left(\sqrt[n]{\frac{Pa}{Ps}}\right) \cdot Vtotal \tag{I}$$

Vdv: capacity of reducing agent circulation space in the reducing agent injection valve
Va: capacity of reducing agent circulation space in the first area Vb: capacity of reducing agent circulation space in the second area Vtotal: capacity of reducing agent circulation space from the outlet of the pump to the injection nozzles of the reducing agent injection valve Pa: atmospheric pressure Ps: set pressure when pumping reducing agent (system pressure)

n: polytropic exponent

For example, when the pipe of the second reducing agent passage 33 has a constant diameter d and the circulation space of urea aqueous solution in the reducing agent injection valve 25 has a cross-sectional area the virtual diameter of which is approximated by the diameter d of the pipe, the capacity in the above equation (I) is replaced by the length of the pipe, and the length of the pipe configuring the siphon function portion 50 can be represented by the following equation (VII):

[Eq. 8]

$$Ldv + La + Lb > \left( \sqrt[n]{\frac{Pa}{Ps}} \right) \cdot Ltotal \qquad (VII)$$

Ldv: length of reducing agent circulation space in the reducing agent injection valve La: length of the first area Lb: length of the second area Ltotal: length from the outlet of the pump to the injection nozzles of the reducing agent injection valve Pa: atmospheric pressure Ps: set pressure when pumping reducing agent (system pressure)

n: polytropic exponent

The above equation (I) or (VII) is a condition equation for setting the total capacity of the siphon function portion 50. In order for the siphon function portion 50 to satisfy the condition of the above equation (I) or (VII), the capacities Va, Vb or the lengths La, Lb of the first area 51 and the second area 53 should be set in consideration of the capacity Vdv or the length Ldv of the reducing agent injection valve 25 to be used, and further, the system pressure Ps when the reducing agent supply apparatus 20 operates. As a result, when the pressure Pu in the second reducing agent passage 33 is pressurized to be equal to the system pressure Ps, the front face of urea aqueous solution pumped by the pump 23 securely reaches the second area 53.

Furthermore, with the reducing agent injection valve 25 completely closed and the pipe assumed to be blocked with urea aqueous solution at the boundary between the first area 51 and the second area 53, when the volume of the gas in the reducing agent injection valve 25 and the first area 51 with the inside of the reducing agent injection valve 25 and the second reducing agent passage 33 pressurized to the system pressure Ps is denoted by $Vs_{(dv+a)}$, from the above equation (III), the following equations (VIII) and (IX) hold:

[Eq. 9]

$$Pa \cdot (Vdv+Va)^n = Ps \cdot Vs_{(dv+a)}{}^n \qquad (VIII)$$

Pa: atmospheric pressure

Ps: set pressure when pumping urea aqueous solution (system pressure)

Vdv: capacity of reducing agent circulation space in the reducing agent injection valve Va: capacity of reducing agent circulation space in the first area $Vs_{(dv+a)}$: volume of air for Vdv+Va under the system pressure n: polytropic exponent

[Eq. 10]

$$\frac{Vs(dv+a)}{Vdv+Va} = \sqrt[n]{\frac{Pa}{Ps}} \qquad (IX)$$

Vdv: capacity of reducing agent circulation space in the reducing agent injection valve Va: capacity of reducing agent circulation space in the first area $Vs_{(dv+a)}$: volume of air for Vdv+Va under the system pressure Pa: atmospheric pressure Ps: set pressure when pumping reducing agent (system pressure)

n: polytropic exponent

With the reducing agent injection valve 25 completely closed, in order to cause urea aqueous solution accumulated in the deepest portion 52 of the siphon function portion 50 to reach the inside of the reducing agent injection valve 25 by driving the pump 23, the volume $Vs_{(dv+a)}$ of the gas under the system pressure Ps should be smaller than the capacity Vdv of the reducing agent injection valve 25, as represented by the following equation (X):

[Eq. 11]

$$Vdv > Vs_{(dv+a)} \qquad (X)$$

Vdv: capacity of reducing agent circulation space in the reducing agent injection valve $Vs_{(dv+a)}$: volume of air for Vdv+Va under the system pressure From the above equations (IX) and (X), it can be seen that the siphon function portion 50 should be configured so that the sum of the capacity Vdv of the reducing agent injection valve 25 and the capacity Va of the first area 51 satisfies the following equation (II):

[Eq. 12]

$$Vdv > \left( \sqrt[n]{\frac{Pa}{Ps}} \right) \cdot (Vdv+Va) \qquad (II)$$

Vdv: capacity of reducing agent circulation space in the reducing agent injection valve Va: capacity of reducing agent circulation space in the first area Pa: atmospheric pressure Ps: set pressure when pumping reducing agent (system pressure)

n: polytropic exponent

For example, when the pipe of the second reducing agent passage 33 has a constant diameter d and the circulation space of urea aqueous solution in the reducing agent injection valve 25 has a cross-sectional area the virtual diameter of which is approximated by the diameter d of the pipe, the capacity in the above equation (II) is replaced by the length of the pipe, and the length of the first area 51 of the siphon function portion 50 is represented by the following equation (XI):

[Eq. 13]

$$Ldv > \left(\sqrt[n]{\frac{Pa}{Ps}}\right) \cdot (Ldv + La) \quad \text{(XI)}$$

Ldv: length of reducing agent circulation space in the reducing agent injection valve La: length of reducing agent circulation space in the first area Pa: atmospheric pressure Ps: set pressure when pumping reducing agent (system pressure)

n: polytropic exponent

The above equation (II) or (XI) is a condition equation for setting the capacity of the first area 51 of the siphon function portion 50. In order for the siphon function portion 50 to satisfy the condition of the above equation (II) or (XI), the capacity Va or the length La of the first area 51 should be set in consideration of the capacity Vdv or the length Ldv of the reducing agent injection valve 25 to be used, and further, the system pressure Ps when the reducing agent supply apparatus 20 operates. As a result, when the pressure Pu in the second reducing agent passage 33 is pressurized to be equal to the system pressure Ps, urea aqueous solution accumulated in the deepest portion 52 is pushed to reach the inside of the reducing agent injection valve 25.

Based on the design condition shown by the above equations (I) and (II), an example of the steps for designing the siphon function portion 50 is described below.

First, from the above equation (II), the following equation (XII) holds:

[Eq. 14]

$$Va < \left(\sqrt[n]{\frac{Ps}{Pa}} - 1\right) \cdot Vdv \quad \text{(XII)}$$

Vdv: capacity of reducing agent circulation space in the reducing agent injection valve Va: capacity of reducing agent circulation space in the first area Pa: atmospheric pressure Ps: set pressure when pumping reducing agent (system pressure)

n: polytropic exponent

Assuming that the capacity Vdv of the reducing agent injection valve 25 to be used and the total capacity Vtotal of the circulation space of urea aqueous solution from the outlet of the pump 23 to the injection nozzles of the reducing agent injection valve 25 is fixed, first, based on the above equation (XII), the capacity Va of the first area 51 is determined using the known capacity Vdv of the reducing agent injection valve 25.

Furthermore, from the above equation (I), the following equation (XIII) holds:

[Eq. 15]

$$Vb > \left(\sqrt[n]{\frac{Pa}{Ps}}\right) \cdot Vtotal - (Vdv + Va) \quad \text{(XIII)}$$

Vdv: capacity of reducing agent circulation space in the reducing agent injection valve Va: capacity of reducing agent circulation space in the first area Vb: capacity of reducing agent circulation space in the second area Vtotal: capacity of reducing agent circulation space from the outlet of the pump to the injection nozzles of the reducing agent injection valve Pa: atmospheric pressure Ps: set pressure when pumping reducing agent (system pressure)

n: polytropic exponent

Once the capacity Va of the first area 51 is determined, based on the equation (XIII), the capacity Vb of the second area 53 is determined using the capacity Va of the first area 51 and the capacity Vdv of the reducing agent injection valve 25. Thus, the siphon function portion 50 satisfying a predetermined condition is configured.

Needless to say, when the pipe of the second reducing agent passage 33 has a constant diameter d and the circulation space of urea aqueous solution in the reducing agent injection valve 25 has a cross-sectional area the virtual diameter of which is approximated by the diameter d of the pipe, based on the above equations (VII) and (XI), by determining the length La of the first area 51 and the length Lb of the second area 53 in a similar way, the siphon function portion 50 satisfying a predetermined condition can be configured.

In the method for designing the siphon function portion 50 described above, the polytropic exponent n can be assumed depending on an environment condition in which the exhaust gas purification apparatus 10 is used or on the configuration of the reducing agent supply apparatus 20 or can be set based on a previously performed experiment or the like. Here, conditions to be considered are a factor influencing the volume of gas against the pressure Pu in the second reducing agent passage 33 and a factor influencing the collapsibility of the interface between urea aqueous solution and gas in the second reducing agent passage 33.

Figure 5:
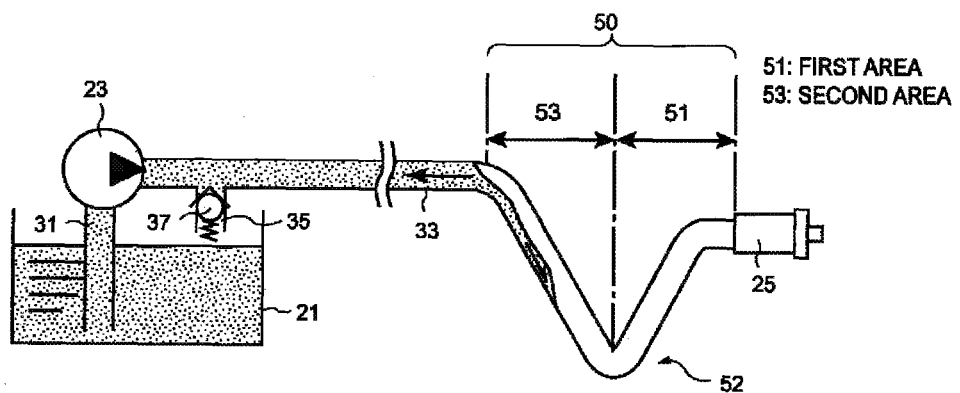
[FIG. 5] A diagram for describing the collapsibility of the liquid surface of urea aqueous solution.

Among these, the collapsibility of the interface between urea aqueous solution and gas is a key factor for retentivity of urea aqueous solution in the deepest portion 52 when the inside of the second reducing agent passage 33 is depressurized. Specifically, if the interface between urea aqueous solution and gas is likely to collapse, when the inside of the second reducing agent passage 33 is depressurized, some urea aqueous solution in the second area 53 becomes likely to fall downwardly by gravity and likely to accumulate in the deepest portion 52, as shown in FIG. 5.

Environmental conditions to be considered include, for example, temperature around the siphon function portion 50, temperature, viscosity of urea aqueous solution, vibration state, surface tension of the passage, and the like, at the start of the internal combustion engine 1. Configuration to be considered of the reducing agent supply apparatus 20 includes, for example, material, inner diameter of the pipe, wettability of inner periphery of the pipe, presence/absence and heating temperature of a heating means provided on the second reducing agent passage 33 and the like, coefficient of heat transfer of wall surface of the pipe, and the like.

There is no particular limitation on the angle between the first area 51 (or the second area 53) and the horizontal plane. As far as the conditions of the above equation (I) or (VII) and the above equation (II) or (XI) is satisfied, the angle can be appropriately set within the range of 0 to 90°.

Figure 6:
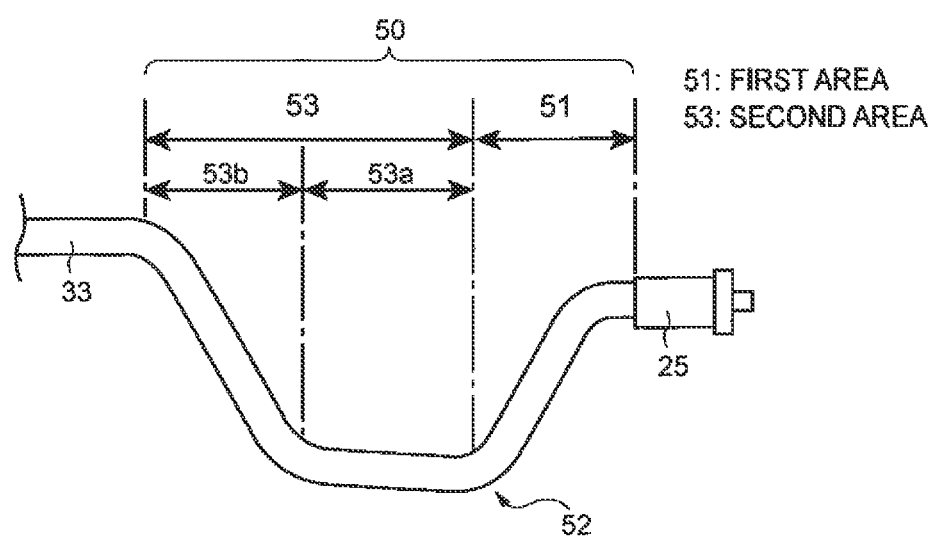
[FIG. 6] A diagram for describing another configuration example of the siphon function portion.

However, in configuring the siphon function portion 50 by devising the layout of the pipe, it is preferable that the second area 53 is configured so as to include a plurality of areas 53a, 53b having different angles with the horizontal plane, and the angle between the area 53a near the first area 51 and the horizontal plane is relatively smaller, as shown in FIG. 6.

Figure 7:
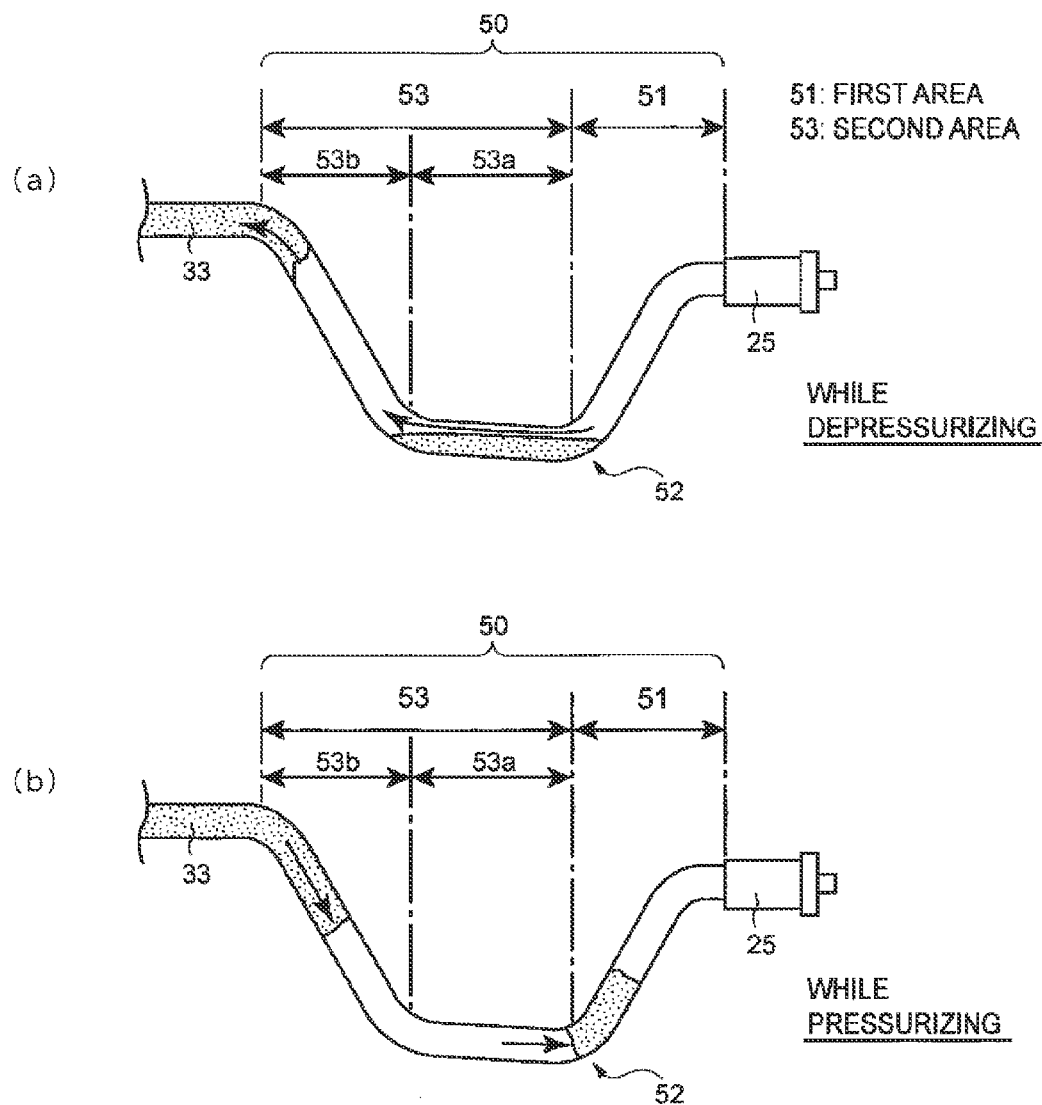
[FIG. 7] A diagram for describing the effect of the another configuration example of the siphon function portion.

With the second area 53 thus configured, when urea aqueous solution is accumulated in the deepest portion 52 and the inside of the second reducing agent passage 33 is depressurized, even if the diameter of the pipe is relatively smaller, the accumulated urea aqueous solution becomes laminar to facilitate securing of a passage for gas, making some of the urea aqueous solution more likely to be accumulated in the deepest portion 52, as shown in FIG. 7(a). On the other hand, when the inside of the second reducing agent passage 33 is pressurized, if the diameter of the pipe is relatively smaller, the accumulated urea aqueous solution becomes likely to block the reducing agent passage, making the urea aqueous solution more likely to be pushed into the reducing agent injection valve 25 side, as shown in FIG. 7(b).

In configuring the second area 53 so as to include a plurality of areas 53a, 53b having different angles with the horizontal plane, the angle between the area 53a near the first area 51 and the horizontal plane is preferably within the range of 0 to 15°, for example. Depending on the cross-sectional area of the area 53a, the wettability of inner periphery of the pipe and the like, if that angle is within the range of 0 to 15°, when the inside of the second reducing agent passage 33 is depressurized, urea aqueous solution accumulated in the deepest portion 52 becomes likely to be laminar. Especially, with the angle between the area 53a near the first area 51 and the horizontal plane within the range of 0 to 15°, urea aqueous solution accumulated in the siphon function portion 50 can be collected into the deepest portion 52 side, and when the inside of the second reducing agent passage 33 is pressurized, the accumulated urea aqueous solution can be caused to securely reach the inside of the reducing agent injection valve 25.

Furthermore, the second portion 53 of the siphon function portion 50 shown in FIG. 6 includes two areas 53a, 53b having different angles with the horizontal plane, but the second area 53 may include three or more areas having different angles with the horizontal plane. Also in this case, with the angle between the area nearest the first area 51 and the horizontal plane within the range of 0 to 15°, when the inside of the second reducing agent passage 33 is depressurized, urea aqueous solution accumulated in the deepest portion 52 becomes likely to be laminar.

Figure 8:
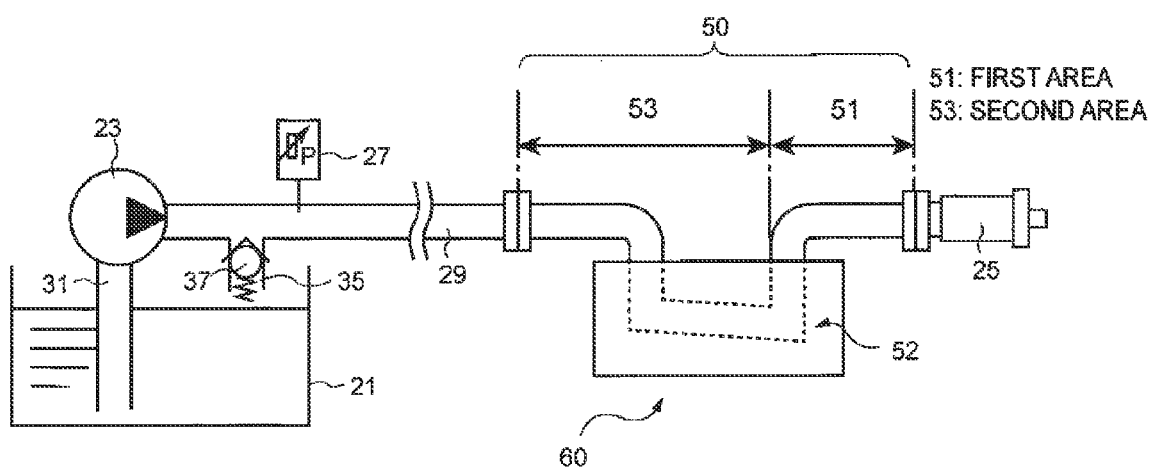
[FIG. 8] A diagram for describing an example of configuring the siphon function portion using a siphon unit.

The siphon function portion 50 described above is configured by devising the layout of the pipe forming the second reducing agent passage 33, but the siphon function portion 50 may also be configured without such a pipe. For example, as shown in FIG. 8, a siphon unit 60 in which the first area 51 and the second area 53 are designed so as to satisfy the condition of the above equations (I) and (II) can also be provided between the reducing agent injection valve 25 and a pipe 29.

With the thus configured siphon function portion 50 provided in part of the second reducing agent passage 33, if some urea aqueous solution is accumulated in the deepest portion 52 of the siphon function portion 50 after the purge process during the previous stop of the internal combustion engine 1, when the pump 23 is started at the start of the internal combustion engine 1, urea aqueous solution accumulated in the deepest portion 52 can be caused to reach the inside of the reducing agent injection valve 25. Accordingly, even when the reducing agent injection valve 25 is stuck closed due to solidified urea aqueous solution in the reducing agent injection valve 25, the solidified urea aqueous solution can be quickly melted.

Furthermore, if urea aqueous solution has been entirely collected by the purge process during the previous stop of the internal combustion engine 1, the pump 23 is started at the start of the internal combustion engine 1, then the pressure Pu in the second reducing agent passage 33 is temporarily increased to be equal to the system pressure Ps and then decreased, which can cause some urea aqueous solution to be accumulated in the deepest portion 52. Then, the pressure Pu in the second reducing agent passage 33 is increased to be equal to the system pressure Ps again, which can cause the urea aqueous solution accumulated in the deepest portion 52 to reach the inside of the reducing agent injection valve 25. Accordingly, even when the reducing agent injection valve 25 is stuck closed due to solidified urea aqueous solution in the reducing agent injection valve 25, the solidified urea aqueous solution can be quickly melted.

2. Method for Controlling the Reducing Agent Supply Apparatus

Next, an example of a method for controlling the reducing agent supply apparatus performed at the start of the internal combustion engine 1 by the control processing unit 40 provided in the exhaust gas purification apparatus 10 of the embodiment is described with reference to a flowchart shown in FIG. 9.

First, in step S1, when it is detected that an ignition switch for starting the internal combustion engine 1 is turned ON, in step S2, the pump 23 is started to increase the pressure Pu in the second reducing agent passage 33 to be equal to the system pressure Ps. At this time, the reverting valve 24 is switched so that urea aqueous solution flows in forward direction from the storage tank 21 side toward reducing agent injection valve 25 side.

Next, in step S3, injection control of urea aqueous solution is performed using the reducing agent injection valve 25, then, in step S4, it is determined whether or not the injection control is performed successfully. This determination may be performed using various methods with no particular limitation. For example, whether or not the injection control is performed successfully can be determined by determining whether or not $NO_x$ concentration downstream from the reducing catalyst 11 is within a proper range, determining whether or not the output power of the pump 23 varies according to an indicated injection amount of urea aqueous solution, or determining whether or not the sensor value of the pressure sensor 27 varies according to the indicated injection amount of urea aqueous solution.

In step S4, if determined that the injection control of urea aqueous solution is performed successfully (i.e., Yes), this routine of starting control ends and the process proceeds to normal control mode. On the other hand, if determined that the injection control of urea aqueous solution is not performed successfully (i.e., No), the process proceeds to step S5 where the output power of the pump 23 is decreased to temporarily depressurize the inside of the second reducing agent passage 33. When the reducing agent injection valve 25 is stuck closed due to solidified urea aqueous solution, this depressurization can cause some urea aqueous solution to be accumulated in the deepest portion 52 of the siphon function portion 50.

Next, in step S6, the output power of the pump 23 is increased again to revert the pressure Pu in the second reducing agent passage 33 to be equal to the system pressure Ps. When the reducing agent injection valve 25 is stuck closed due to solidified urea aqueous solution, this pressurization can cause urea aqueous solution accumulated in the deepest portion 52 of the siphon function portion 50 to reach the inside of the reducing agent injection valve 25, allowing the solidified urea aqueous solution to be melted. Then, the process returns to step S3 and the following steps will be repeated until it is determined that the injection control of urea aqueous solution is performed successfully.

As described above, by performing the method of controlling the reducing agent supply apparatus 20 at the start of the internal combustion engine 1, when the reducing agent injection valve 25 is stuck closed due to solidified urea aqueous solution in the reducing agent injection valve 25, some of the urea aqueous solution can be caused to quickly reach the inside of the reducing agent injection valve 25 to melt the solidified urea aqueous solution. As a result, the successful injection control of urea aqueous solution is started earlier, which can increase the purification efficiency of $NO_x$.

Figure 9:
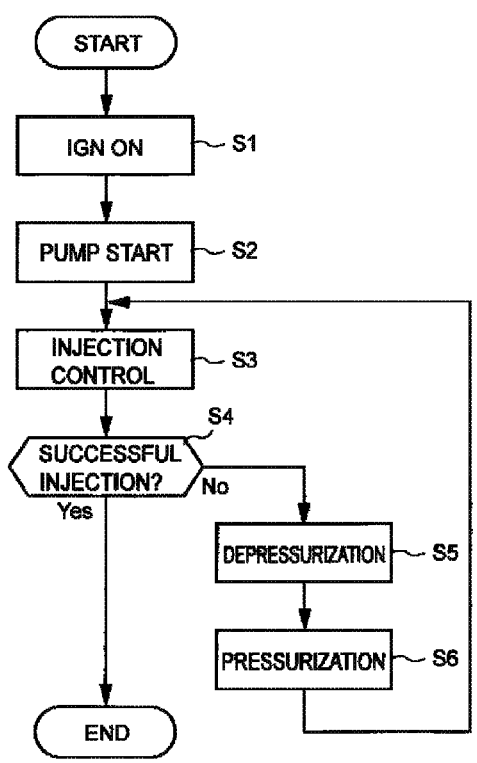
[FIG. 9] A flowchart for describing an example of a method for controlling the reducing agent supply apparatus.

Note that the method for controlling a reducing agent supply apparatus shown in the flowchart of FIG. 9 is only an example. The method for controlling the reducing agent supply apparatus 20 of the embodiment is not limited to this example.

Not also that a liquid reducing agent is not limited to urea aqueous solution. The invention can be applied to a reducing agent supply apparatus using any solidifiable liquid reducing agent.

The invention claimed is

1. A reducing agent supply apparatus, comprising: a storage tank for storing liquid reducing agent; a pump for pumping the reducing agent; a reducing agent injection valve for injecting the reducing agent pumped by the pump in an exhaust pipe of an internal combustion engine; and a reducing agent passage connecting the pump to the reducing agent injection valve,
wherein, when the internal combustion engine stops, a purge process of collecting the reducing agent in the reducing agent passage into the storage tank is performed, and
wherein, on part of the reducing agent passage, a siphon function portion is provided for, even when, at the start of the internal combustion engine, the reducing agent injection valve is in injection failure due to solidification of the reducing agent in the reducing agent injection valve, causing some of the reducing agent to reach the reducing agent injection valve after the start of the pump to cause the solidified reducing agent to melt.

2. The reducing agent supply apparatus according to claim 1, wherein the siphon function portion includes: a first area provided adjacent to the reducing agent injection valve, in which a reducing agent passage is placed downwardly from the position in height of the reducing agent injection valve; and a second area provided adjacent to the first area, in which a reducing agent passage is placed upwardly from the position in height of the deepest portion of the first area, and
wherein the siphon function portion is configured so that, when, at the start of the internal combustion engine, the reducing agent injection valve is closed and the pump is started, the front face of the pumped reducing agent will reach the inside of the second area.

3. The reducing agent supply apparatus according to claim 2, wherein the siphon function portion is configured so that the following equation (I) holds:

[Eq. 1]

$$Vdv + Va + Vb > \left(n\sqrt{\frac{Pa}{Ps}}\right) \cdot Vtotal \qquad (I)$$

Vdv: capacity of reducing agent circulation space in the reducing agent injection valve Va: capacity of reducing agent circulation space in the first area Vb: capacity of reducing agent circulation space in the second area Vtotal: capacity of reducing agent circulation space from the outlet of the pump to injection nozzles of the reducing agent injection valve Pa: atmospheric pressure Ps: set pressure when pumping reducing agent (system pressure)

n: polytropic exponent.

4. The reducing agent supply apparatus according to claim 1, wherein the first area is configured so that, when, at the start of the internal combustion engine, the reducing agent injection valve is closed and the pump is started, the reducing agent accumulated in the deepest portion of the first area will reach the inside of the reducing agent injection valve.

5. The reducing agent supply apparatus according to claim 4, wherein the siphon function portion is configured so that the following equation (II) holds:

[Eq. 2]

$$Vdv > \left(n\sqrt{\frac{Pa}{Ps}}\right) \cdot (Vdv + Va) \qquad (II)$$

Vdv: capacity of reducing agent circulation space in the reducing agent injection valve Va: capacity of reducing agent circulation space in the first area Pa: atmospheric pressure Ps: set pressure when pumping reducing agent (system pressure)

n: polytropic exponent.

6. The reducing agent supply apparatus according to claim 2, wherein the second area includes a plurality of areas having different angles with the horizontal plane, and the angle between the area near the first area and the horizontal plane is relatively smaller.

7. The reducing agent supply apparatus according to claim 3, wherein the second area includes a plurality of areas having different angles with the horizontal plane, and the angle between the area near the first area and the horizontal plane is relatively smaller.

8. A method for controlling a reducing agent supply apparatus, the reducing agent supply apparatus comprising: a storage tank for storing liquid reducing agent; a pump for pumping the reducing agent; a reducing agent injection valve for injecting the reducing agent pumped by the pump in an exhaust pipe of an internal combustion engine; and a reducing agent passage connecting the pump to the reducing agent injection valve,
wherein, on part of the reducing agent passage, a siphon function portion is provided for, even when, at the start of the internal combustion engine, the reducing agent injection valve is in injection failure due to solidification of the reducing agent in the reducing agent injection valve, causing some of the reducing agent to reach the reducing agent injection valve after the start of the pump to cause the solidified reducing agent to melt,
wherein, when the internal combustion engine stops, a purge process of collecting the reducing agent in the reducing agent passage into the storage tank is performed,
wherein the method comprising the steps of:
at the start of the internal combustion engine, determining whether or not, after the start of pumping the reducing agent, injection of the reducing agent has been performed according to an injection instruction to the reducing agent injection valve; and if the injection of the reducing agent has not been performed, temporarily decreasing pressure in the reducing agent passage and then increasing the pressure again, and wherein the steps are repeated until the injection of the reducing agent is performed.

9. An exhaust gas purification apparatus of an internal combustion engine, comprising a reducing agent supply apparatus according to claim 1 and a reducing catalyst for selectively reacting nitrogen oxides in exhaust gas with reducing agent to reduce the nitrogen oxides.

* * * * *